United States Patent
Su

(10) Patent No.: US 7,186,282 B2
(45) Date of Patent: Mar. 6, 2007

(54) MOTOR-VEHICLE AIR CLEANER

(75) Inventor: Hung-Yu Su, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 72 days.

(21) Appl. No.: 10/862,334

(22) Filed: Jun. 8, 2004

(65) Prior Publication Data

US 2005/0268582 A1    Dec. 8, 2005

(51) Int. Cl.
*B01D 46/10*    (2006.01)

(52) U.S. Cl. .................. 55/330; 55/355; 55/385.3; 55/421; 55/423; 55/425; 96/408; 210/130; 210/136; 210/798

(58) Field of Classification Search .............. 55/355, 55/385.3, 330, 421, 423, 425; 210/117, 136, 210/130, 798; 123/198 E; 96/408
See application file for complete search history.

(56) References Cited

U.S. PATENT DOCUMENTS

| | | | | |
|---|---|---|---|---|
| 2,036,106 A | * | 3/1936 | Stuard | 137/204 |
| 2,244,919 A | * | 6/1941 | Peebles | 55/355 |
| 3,807,562 A | * | 4/1974 | Goda | 210/136 |
| 4,318,809 A | * | 3/1982 | Bethel | 210/117 |
| 4,878,923 A | * | 11/1989 | Muller | 55/355 |
| 5,462,679 A | * | 10/1995 | Verdegan et al. | 210/798 |
| 5,800,581 A | * | 9/1998 | Gielink et al. | 55/385.3 |
| 6,676,720 B1 | * | 1/2004 | Simonsen | 55/302 |
| 6,749,744 B1 | * | 6/2004 | Zwanenburg | 210/136 |
| 6,782,917 B2 | * | 8/2004 | Wolford et al. | 137/533.25 |
| 2001/0005982 A1 | * | 7/2001 | Gieseke et al. | 55/330 |
| 2005/0029173 A1 | * | 2/2005 | Kimisawa et al. | 210/136 |
| 2005/0040088 A1 | * | 2/2005 | Cline | 210/130 |

FOREIGN PATENT DOCUMENTS

FR    2636859 A1 *  3/1990 ............. 210/136

* cited by examiner

*Primary Examiner*—Minh-Chau T. Pham
(74) *Attorney, Agent, or Firm*—Leong C. Lei

(57) ABSTRACT

A motor-vehicle air cleaner provided with a check valve mechanism on the lower cap of the air cleaner for drainage and ventilation, and a protection disposed on the outer edge; the check valve being closed as the engine runs to prevent from taking in water vapor and dust; and check valve being opened to dismiss water logging and excessively dense air and fuel admixture; the protection is related to a protection cap to prevent the check valve mechanism from direct contact with the ambient air for keeping off water and dust.

1 Claim, 5 Drawing Sheets

US 7,186,282 B2

MOTOR-VEHICLE AIR CLEANER

BACKGROUND OF THE INVENTION (a) Technical Field of the Invention

The present invention is related to an air cleaner mounted to a motor vehicle, and more particularly, to one that effectively drains, well ventilated and protects the check value so as to prevent difficult starting of the engine due to excessive water vapor and oil vapor.

(b) Description of the Prior Art

For any motor vehicle, a motorcycle or an all terrain vehicle (ATV) operates on introducing the fresh air from the ambient to mix up with the fuel, the admixture is imported into the engine to be ignited and exploded to produce power to further push pistons to engage in reciprocal motion, which in turn is transmitted through the belt to drive the gearbox for the vehicle to advance. As the engine keeps running by depending on the introduction of proper amount of air into the engine, the air carries at the same time water vapor, foreign matters and dust, which when admitted into the engine will damage the engine and air inlet mechanical parts. Furthermore, excessive amount of air vapor will cause difficult start of the engine. To avoid the ingress of air vapor, foreign matters and dust from damaging the engine and air inlet mechanism, an air cleaner is provided in front of the carburetor of the air inlet mechanism in case of a conventional engine to the vehicle or in front of the throttle valve in case of an injection engine to make sure that only the clean air is admitted to maintain the engine in normal working condition.

As illustrated in FIG. 1 of the accompanying drawings, an air cleaner 1 of the prior art is comprised of an upper cap 11, an in-flow chamber 111 defined by the upper cap 11, a filter element 12, a lower cap 13 and a outflow chamber 131 defined by the lower cap 13. Wherein, an air intake passage 14 is disposed into the inflow chamber 111; the filter element 12 usually relates to a filtration cotton; an air outtake passage 14 connected to the carburetor or the throttle valve (not illustrated) is provided to the outflow chamber; a drainage 16 is disposed at where below the outflow chamber 131; the drainage 16 is provided with a pipe 161 extending into where below the body of the vehicle; a jacket 162 provided at the outlet of the pipe 161 to block the pipe 161 and is secured to the drainage 16 by means of a clamping device 163.

Once the engine is running, a large volume of air enters through the air intake passage 14 into the inflow chamber 111 and is filtered into clean air by the filter element 12 before being admitted to the outflow chamber, and then into the carburetor or the throttle valve via the outtake passage 15. The air is mixed with fuel at a proper ratio to form the admixture for combustion in the cylinder to generate power for keeping the engine running. However, the ambient air usually carries water vapor, foreign matters and dust. Foreign matters and dust may pass through the filter element while the water vapor may condense into water drops to log inside the outflow chamber 131. When the water logging is observed in the pipe, the jacket 162 is removed to drain out the water. Nonetheless, the drainage mechanism is provided with only the drain function, it takes constant attention by the user to watch for any water logging inside the air cleaner for drainage in time. Excessive logging of air vapor and fuel vapor will kill the engine particularly when riding or driving for a long distance on a sand beach or a creek bed, and it is very difficult to get the engine to start again.

SUMMARY OF THE INVENTION

The primary purpose of the present invention is to provide a motor vehicle that allows easy starting of the engine by effectively preventing excessive logging of water vapor and fuel vapor in the air cleaner. To achieve this purpose, a check valve mechanism is provided to the lower cap of the air cleaner and a protection is provided to the check valve mechanism to keep off water and dust.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
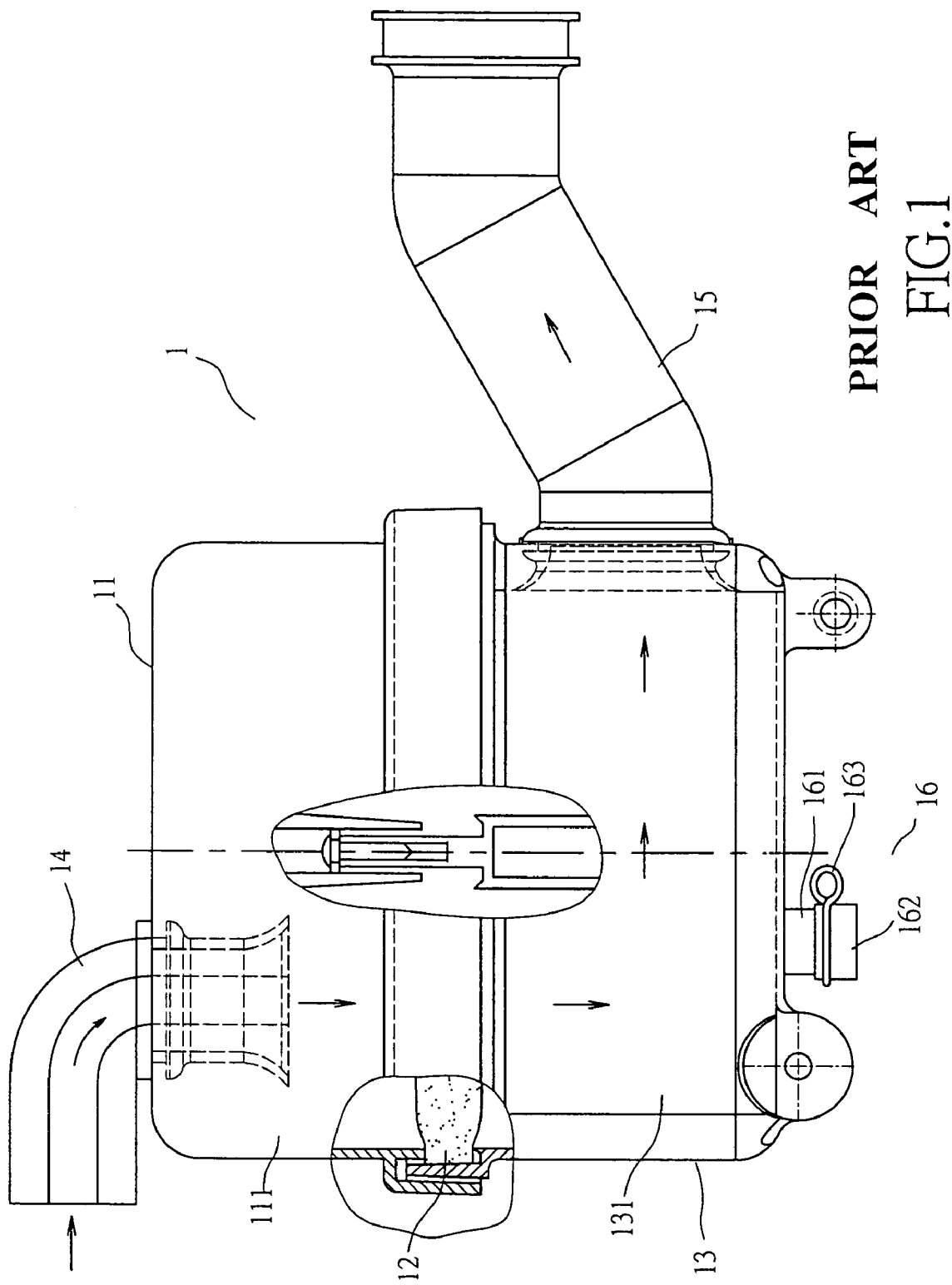
FIG. 1 is a schematic view of an air cleaner of the prior art.
Figure 2:
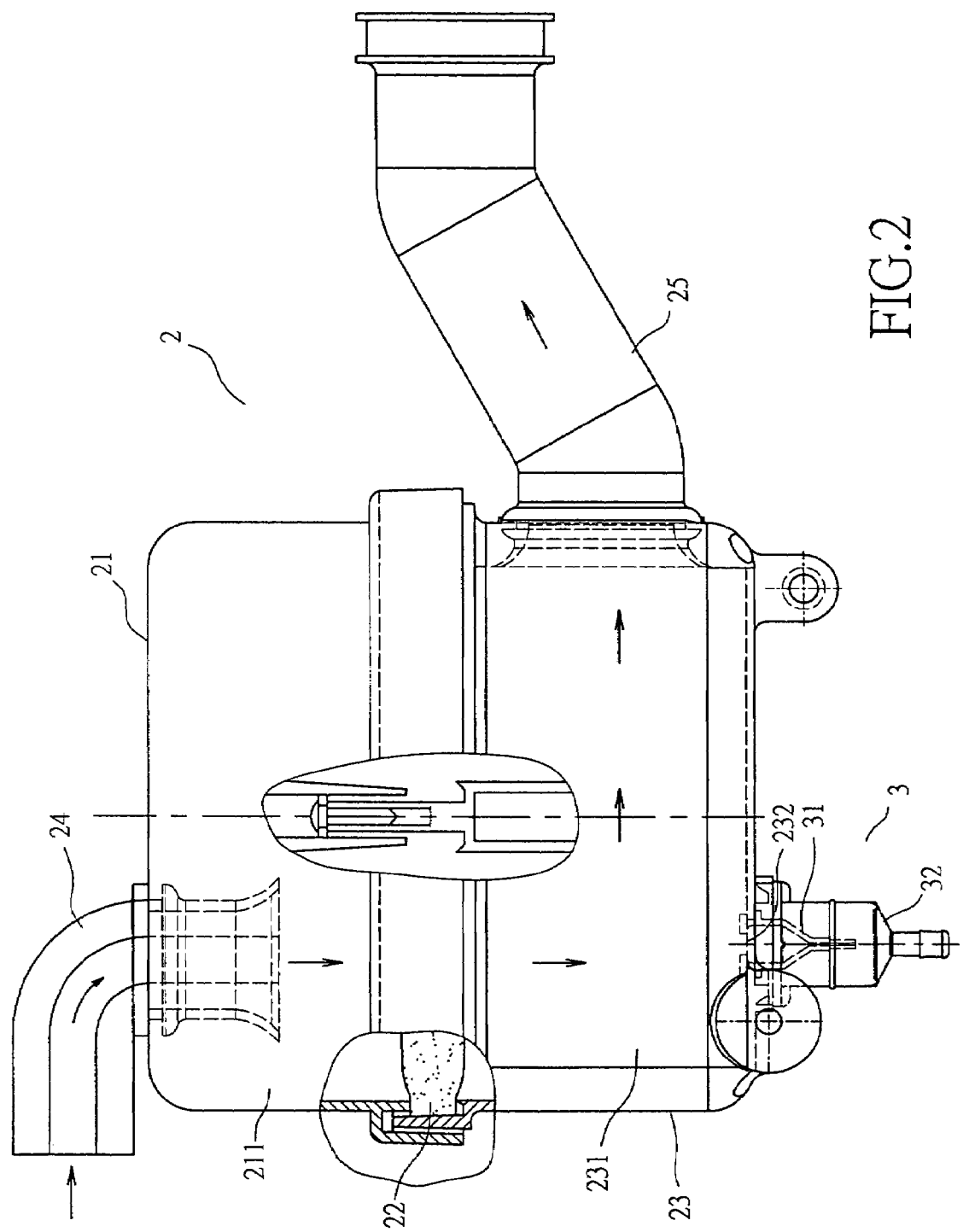
FIG. 2 is a schematic view showing an assembly of an air cleaner of a preferred embodiment of the present invention.
Figure 3:
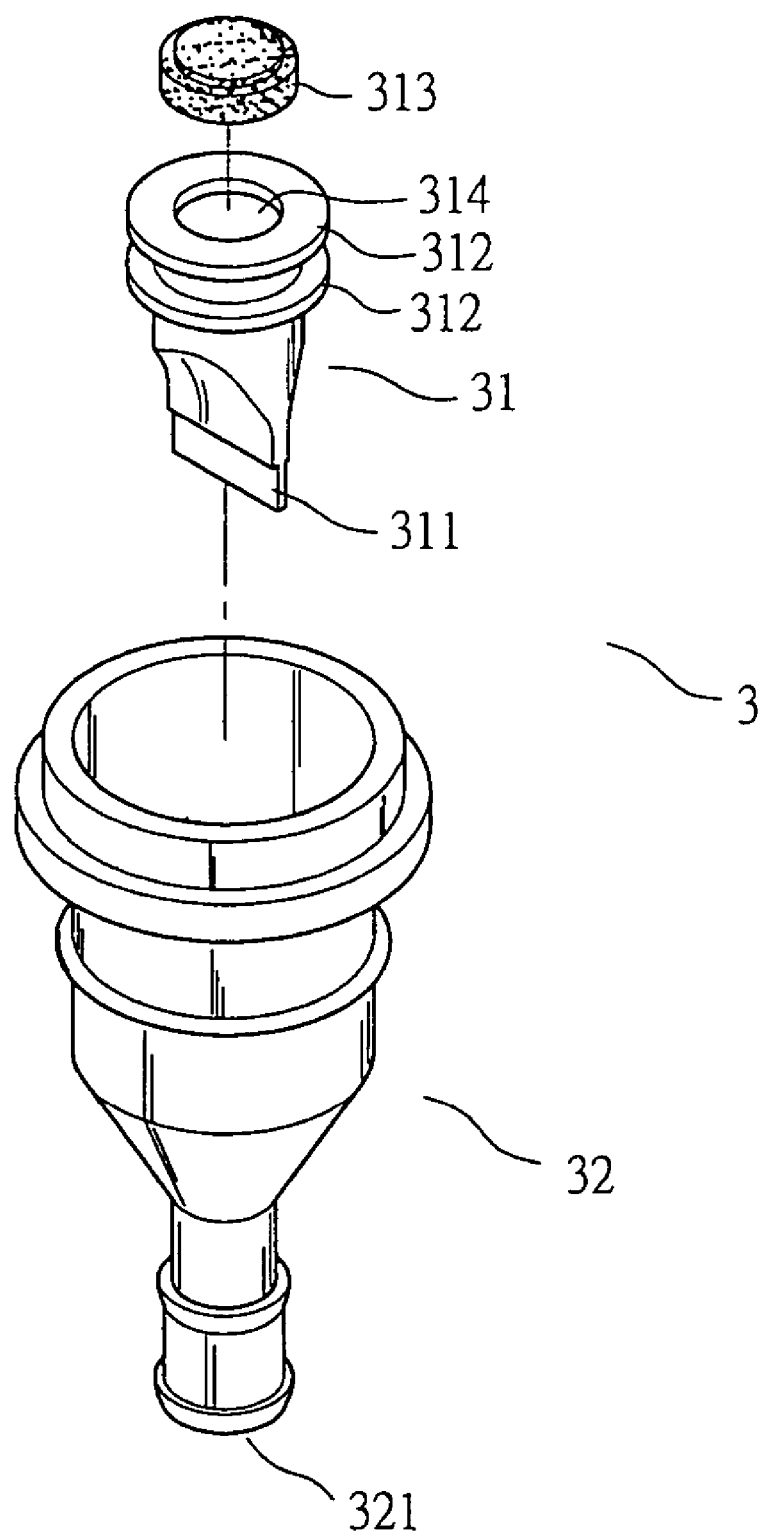
FIG. 3 is an exploded view of a drainage mechanism of the preferred embodiment of the present invention.

Referring to FIG. 2, an air cleaner 2 of the present invention is comprised of an upper cap 21, an inflow chamber 211 defined by the cap 21, an filter element 22, a lower cap 23, an outflow chamber 231 defined by the lower cap 23, and a drainage mechanism 3. Wherein, an air intake passage 24 is provided in the inflow chamber 221; the filter element 22 is made of filtration cotton; and an air outtake passage 25 connected to a carburetor or a throttle valve is provided to the outflow chamber 231. A drainage mechanism 3 provided to the lower cap 23 as illustrated in FIG. 3 is comprised of a check valve mechanism 31 and a protection member 32. The check valve mechanism 31 is a hollow member made of rubber and is provided with two flanges 312 at its top to be engaged with an outlet 232 disposed at the lower cap 23. The check valve mechanism 31 reduces at its lower end to form a slim and flushed drain 311. Meanwhile, another filter element 313 is disposed in an accommodation chamber 314 provided at where above the check valve mechanism 31. The protection member 32 is a funnel member to fully cover up the check valve mechanism 31 while a ventilation port 321 is disposed at the lower end of the protection member 32.

Figure 4:
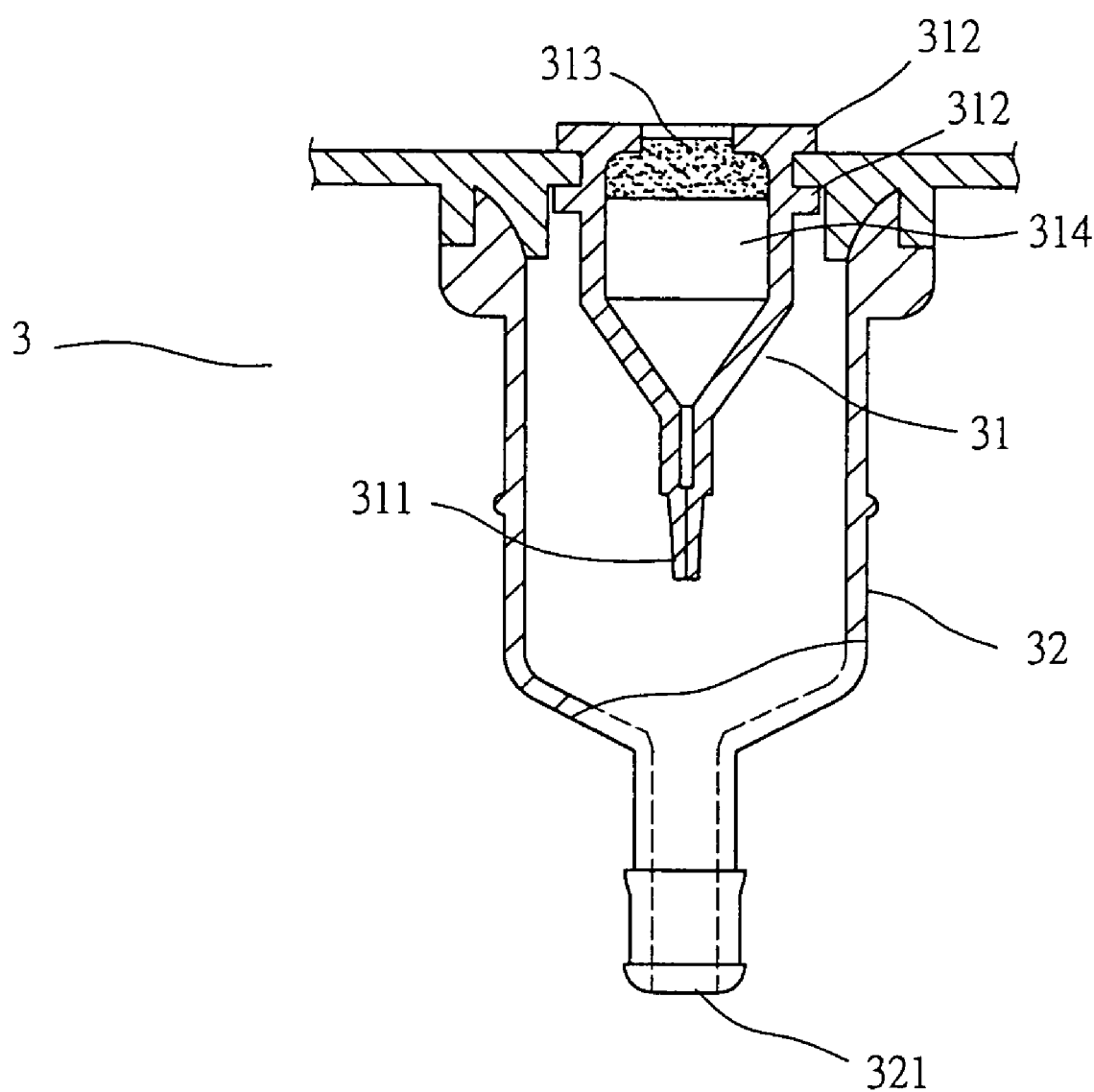
FIG. 4 is a sectional view showing that the drainage mechanism is in closed status.
Figure 5:
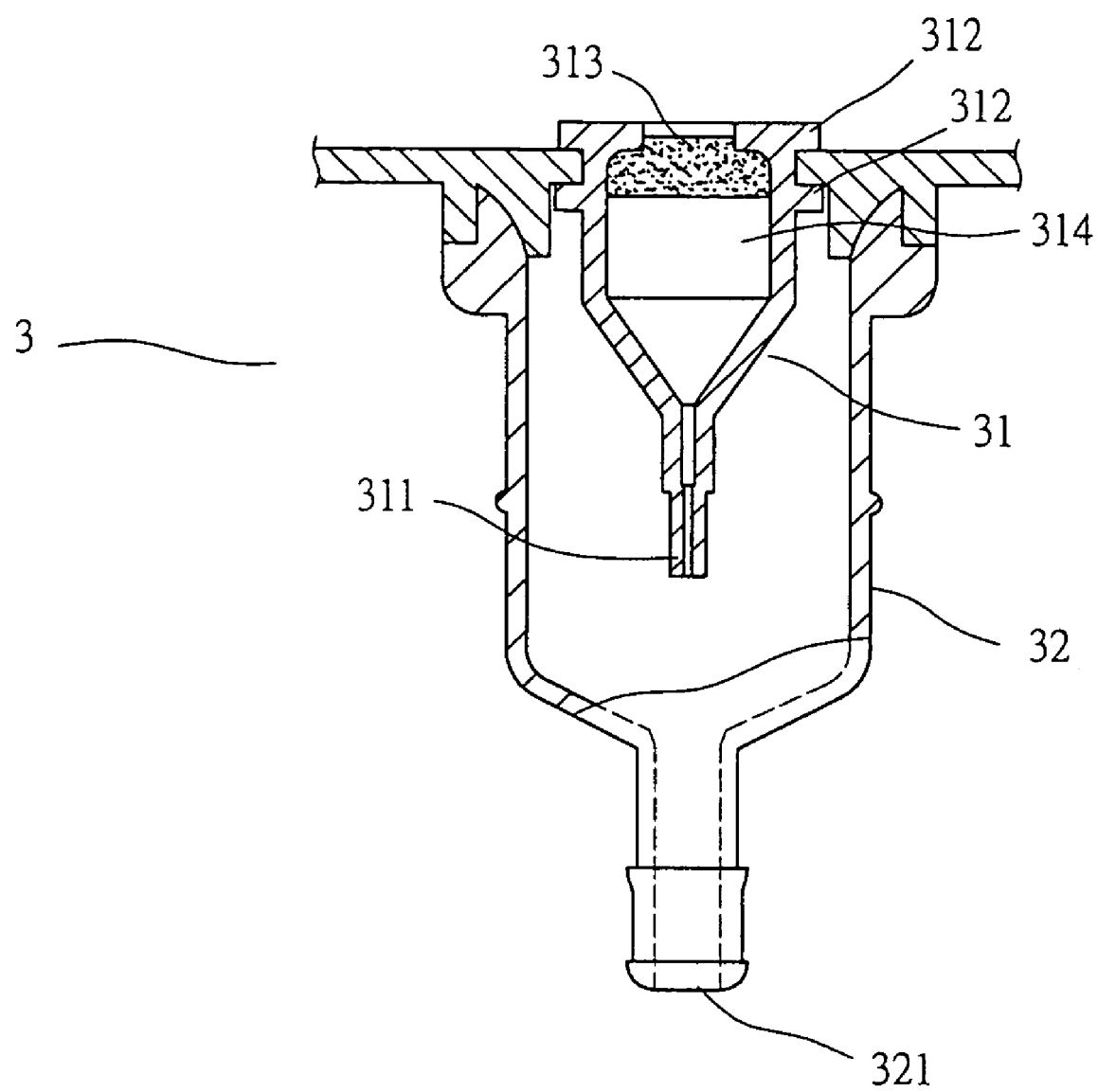
FIG. 5 is a sectional view showing that the drainage mechanism is in open status.

Once the engine is running, the air required in the combustion chamber of the engine is introduced through the intake passage 24 of the air cleaner 2, filtered by the filter element 22 before being admitted to the carburetor or the throttle valve through the air outtake passage 25, and further into the engine. As the engine runs, the outflow chamber 231 is in a negative pressure status to create a suction force to close up the rubber made drain 311 of the check valve mechanism 31 provided at the outlet 232 at the lower cap 23 as illustrated in FIG. 4 to prevent the water vapor and dust from being sucked into the air cleaner 2 through the drain 311. As the engine stops, the pressure inside the outflow chamber 231 is equivalent to that of the ambient to leave the drain 311 of the check valve mechanism 31 open as illustrated in FIG. 5 to achieve its purpose of drainage and ventilation. Water logging and excessively dense fuel vapor are discharged through the drain 311 into the protection 32, and further into the ambient through the ventilation port 321 of the protection 32. The filter element 313 provided inside the chamber 314 above the check valve mechanism 31 filters once again to prevent foreign matters and dust to escape into the air cleaner 2 through the drain 311. The protection 32 prevents the check valve mechanism 31 from direct contact with the ambient, and the check valve mechanism 31 is well guarded by the protection 32 for extended service life for the air cleaner to faithfully perform its functions of drain and ventilation. For being free of the excessive water vapor and fuel vapor, an easy start of the engine is secured and the check valve mechanism achieves its purposes of stopping the ingress of water and dust.

The present invention by providing a check valve mechanism and a protection improves the flaws of failure in automatic drain and ventilation as found in the air cleaner of the prior art; while the protection helps extend the service life of the check valve mechanism.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A motor vehicle air cleaner comprising:
   an upper cap having an inflow chamber, said inflow chamber being provided with an air intake passage;
   a lower cap engaged with said upper cap and having an outflow chamber;
   a first filter element arranged between said inflow chamber of said upper cap and said outflow chamber of said lower cap, said outflow chamber having an outtake passage; and
   a drainage mechanism provided to a bottom of said upper cap, said drainage mechanism having a flannel member and a check valve mechanism fitted into said funnel member, said check valve mechanism being a hollow member made of rubber and having a top end provided with two flanges engaged with an outlet of said lower cap, said check valve mechanism having a lower end which reduces into a slim and flushed drain, a second filter element fitted in said check valve mechanism, said funnel member having a lower end provided with a ventilation port;
   whereby when in operation, said outflow chamber is in a negative pressure status to create a suction force to close up said drain thereby preventing water vapor or dust from being sucked into said outflow chamber through said drain, and when not in operation, pressure inside said outflow chamber is equal to ambient pressure to leave said drain open thereby enabling water and vapor to be discharged into said funnel member.

* * * * *